United States Patent [19]

Bergh

[11] Patent Number: 5,318,251
[45] Date of Patent: Jun. 7, 1994

[54] PROTECTIVE FLEXIBLE BOOT

[75] Inventor: Eugene H. Bergh, Hammond, Wis.

[73] Assignee: Minnesota Mining and Manufacturing Company, St. Paul, Minn.

[21] Appl. No.: 92,544

[22] Filed: Jul. 16, 1993

Related U.S. Application Data

[63] Continuation of Ser. No. 803,193, Dec. 5, 1991, abandoned.

[51] Int. Cl.$^5$ .............................................. B64D 45/00
[52] U.S. Cl. ................................. 244/121; 244/129.1; 150/166
[58] Field of Search .................... 244/1 R, 121, 129.1; 150/166, 154, 155, 156; 416/90; 52/301; 428/40

[56] References Cited

U.S. PATENT DOCUMENTS

| | | | |
|---|---|---|---|
| 3,106,374 | 10/1963 | Olson et al. | 244/121 |
| 3,704,738 | 12/1972 | LeCompte | 150/154 |
| 3,915,528 | 10/1975 | Glickman | 428/40 |
| 4,598,883 | 7/1986 | Suter | 150/166 |
| 4,844,286 | 7/1989 | Jacobson | 150/154 |
| 5,114,098 | 5/1992 | Campbell | 244/121 |

FOREIGN PATENT DOCUMENTS 472603  12/1914  France .............................. 150/154

Primary Examiner—Galen L. Barefoot
Attorney, Agent, or Firm—Gary L. Griswold; Walter N. Kirn; James V. Lilly

[57] ABSTRACT

A flexible boot for covering and protecting protruding aircraft structures. The flexible boot is especially well adapted to cover and protect aircraft nose cones. In such an application the boot also protects electronic equipment including radar equipment typically located within the nose cone or radome area of the aircraft. The flexible boot has the advantage that it may be packaged by rolling it up. Preferably no discernible creases or wrinkles develop in the surface of the boot while it remains in rolled-up condition or thereafter when unrolled prior to use. The boot is formed of a flexible curved and continuous cap having a closed end and an opposed open end. The peripheral edge at the open end of the cap lies at or above the equator of the largest sphere which can be inscribed within the cap.

10 Claims, 3 Drawing Sheets

PROTECTIVE FLEXIBLE BOOT

This is continuation of application No. 07/803,193 filed Dec. 5, 1991 now abandoned.

BACKGROUND

1. Field of the Invention

The present invention relates to flexible boots used to cover and protect protruding aircraft structures particularly aircraft nose cones.

2. Description of the Prior Art

Nose cones of both commercial and military aircraft typically house radar equipment. The nose cone is typically formed of an epoxy/fiberglass honeycomb covered with a layer of epoxy/fiberglass sheeting. The nose cone interior provides a hollow space, referred to as a radome area, for housing sensitive electronic and radar equipment. It is important to keep water or moisture from seeping into the fiberglass honeycomb or into the radome area, since such water or moisture could adversely affect the proper operation of the sensitive equipment.

Flexible elastomeric boots are conventionally employed to cover an aircraft nose cone to protect the sensitive radar equipment housed therein. Such elastomeric boots, commonly referred to as radome boots, are molded into a cap-like shape conforming to the shape of the nose cone. Adhesive, typically pressure sensitive adhesive, is coated onto the inside surface of the radome boot so that the boot can be adhesively applied to tightly cover the outside surface of the nose cone. Once applied, the boot prevents infusion of water or other liquids into the radome area while the aircraft is in flight. The elastomeric boot also provides protection from impact of birds in flight. Similarly such elastomeric boots have been used to cover and protect other protruding parts on an aircraft.

Prior art protective boots are typically formed by thermoforming polyurethane to conform to the shape of the nose cone or other protruding part of the aircraft. Such boots are conventionally shipped by placing them over a rigid shipping form of like shape. The shipping form is typically formed of rigid thermoformed polystyrene. The shipping form has been thought to be necessary in order to protect the boot from wrinkling, creasing, or deformation during shipment or storage. The polyurethane boot is normally formed to have a flat flange area protruding along the circumference of its peripheral edge. When the boot is placed over the rigid shipping form, the flange area provides a convenient surface for securing the boot to the shipping form as by stapling the flange thereto. It also provides a convenient gripping surface for manually removing the boot from the form and for applying the boot. After the boot is removed from the rigid shipping form the flange is normally first trimmed. The boot is then applied over the nose cone and adhesively secured thereto.

The conventional rigid shipping form to which the boot is secured may be as expensive or nearly as expensive to manufacture as the boot itself. Therefore, it would be an advantage if an alternative method of shipping and storing the boot could be devised that would eliminate the need for the shipping form. The alternative shipping and storage method should not cause permanent distortion as by becoming wrinkled or creased.

SUMMARY OF THE INVENTION

The present invention is directed to a flexible boot which can be used to protect protruding parts of moving apparatus, particularly protruding parts of aircraft.

The flexible boot may be used to cover and protect protruding apparatus on aircraft, for example the nose of external fuel tanks, the leading nose of bomb racks, and the leading nose of luggage racks (travel pods) often found on small trainer airplanes.

In a specific aspect the flexible boot of the invention can be used to cover and protect the nose cone of commercial, private, and military aircraft. In such application the boot also protects the electronic and radar equipment located within the nose cone, also called the radome structure. The flexible boot in this application may be conveniently referred to as a radome boot.

The boot is formed of a flexible, curved and continuous cap which has an open end and opposing closed end. The boot of the invention has the advantage that it may be packaged by simply rolling it up. Preferably no discernible creases or wrinkles develop in the surface of the boot while it remains folded, that is, rolled-up state or thereafter when unfolded. The invention thus eliminates the need for rigid shipping forms conventionally employed in packaging and shipping radome boots.

The flexible cap forming the boot has an inner side and an outer side. The flexible cap can be folded by rolling-up a portion of the cap such that at least a portion of the outer side of the cap inverts and contacts at least a portion of the inner side.

The flexible cap terminates in a peripheral edge at the open end of the boot. The boot is formed such that the peripheral edge lies at or above the equator (in the direction of the closed end) of the largest sphere which can be inscribed within the flexible cap.

DETAILED DESCRIPTION

The elastomeric boot of the invention is molded in the form of a cap. As used herein the largest sphere inscribed within the cap shall be the sphere contacting the most area of the inside surface of the cap. The term equator shall mean the largest circle which can be drawn on the surface of the largest sphere inscribed within the cap. As used herein the equator also lies in a plane perpendicular to the axis of symmetry of the cap.

The term semispherical shall mean a portion of a hollow sphere.

Figure 1:
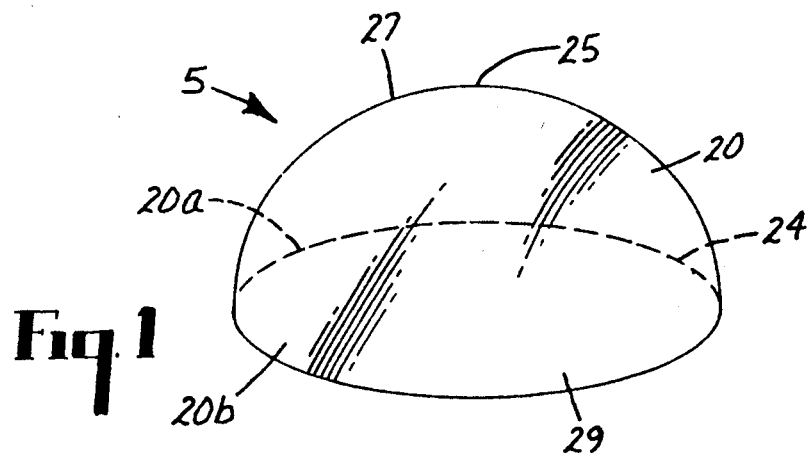
FIG. 1 is a perspective view of a semi-spherical embodiment of the flexible boot of the invention.
Figure 1A:
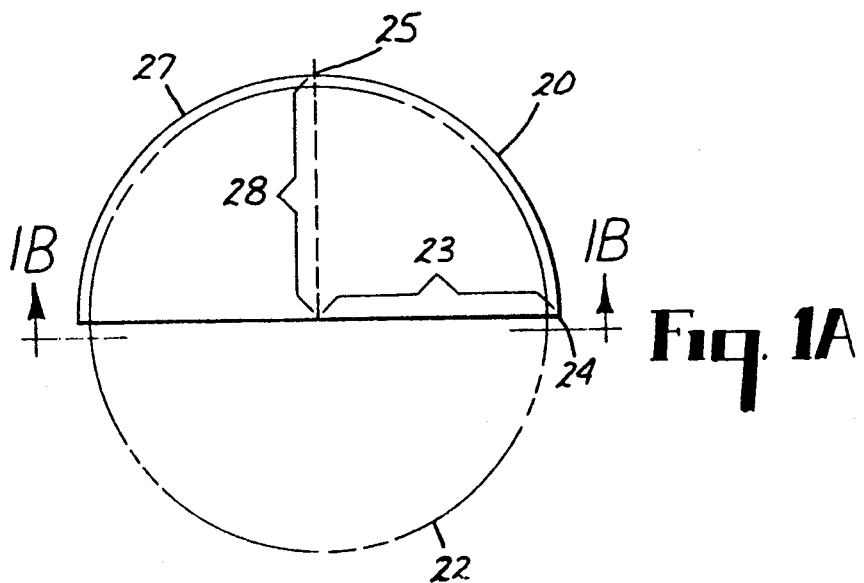
FIG. 1A is an elevational view of the flexible boot shown in FIG. 1 and also shows an inscribed sphere therein.
Figure 1B:
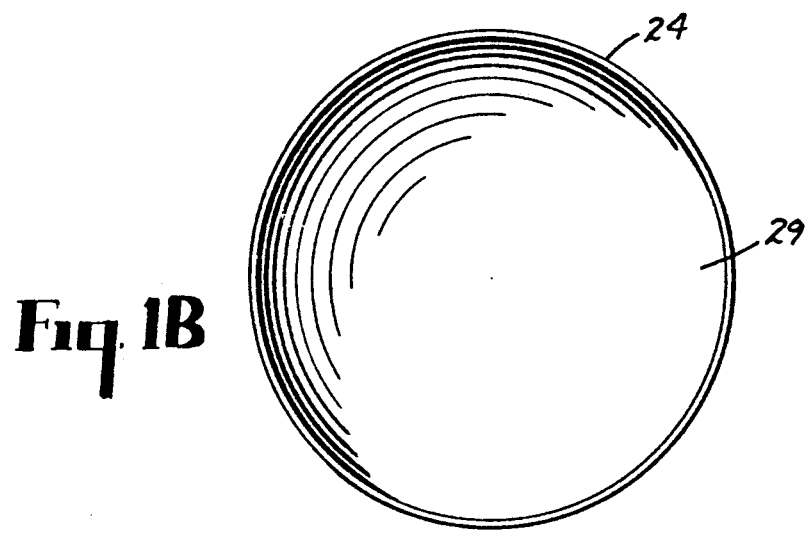
FIG. 1B is an end view of the boot of FIG. 1A taken along sight lines 1B—1B.

In one preferred embodiment of the invention a elastomeric boot 5 (FIG. 1 and 1A) is molded into a cap 20 which is semi-spherical. The elastomeric boot is molded preferably of a polyurethane elastomer, for example by conventional thermoforming. The molded boot is flexible and typically has a thickness of between from about 5 mil (0.13 mm) to 28 mil (0.70 mm). The boot as depicted in FIG. 1 appears as a semi-spherical cap 20 having an open end 29 and an opposed closed end 27. Cap 20 is continuous and has a high point or apex 25 at closed end 27. Cap 20 terminates in a peripheral edge 24 which defines its base, as shown in FIG. 1B. The height 28 is the perpendicular distance from apex 25 to the base of cap 20, that is, height 28 is the perpendicular distance from apex 25 to the plane defined by peripheral edge 24.

With reference to FIG. 1B, if peripheral edge 24 is defined as the trim line and the largest sphere possible, i.e., sphere 22, is inscribed within semi-spherical cap 20, then the trim line 24 of cap 20 should be at or above the equator of inscribed sphere 22 in the direction of apex 25. If such criteria is met then cap 20 can be conveniently rolled-up into a tight package. Another way of expressing the criteria is that if the semi-spherical cap 20, above defined, has a height less than or equal to the radius of the largest sphere 22 which can be inscribed within cap 20, then cap 20 can be conveniently rolled-up into a tight package. The rolling process can be accomplished by simply folding a portion of cap 20, for example portion 20a, inwardly onto itself to form a roll. The process of rolling-up boot 5 into a package is shown schematically in FIG. 4. The remaining portion of cap 20, for example portion 20b, then conveniently overlaps portion 20a whereupon boot 5 takes the form of a tightly rolled-up package illustrated in FIG. 5. Preferably, there are no creases or wrinkles that develop as boot 5 is rolled-up in the above described manner.

A cushioning material 120 such as heavy tissue paper; polymeric film, e.g., polyvinylchloride, polyethylene or polypropylene film; polystyrene nuggets or beads; or soft cellular foam such as polyethylene or polyurethane foam may be placed within boot 5 before cap 20 is rolled-up. Such cushioning material provides a cushion against which cap 20 is rolled and further assures that cap 20 will not develop creases or wrinkles during shipment or transit. The cushioning material is not absolutely required but it can be employed as a safeguard to assure that the flexible cap 20 will not become permanently wrinkled or creased. The above described packaging method for boot 5 has been determined to be applicable regardless of the overall size and dimension of boot 5, provided that it has a height less than or equal to the radius of the largest sphere 22 which can be inscribed therein.

It must be appreciated that although boot 5 is shown having a perfectly semi-spherical cap 20, such cap can in fact be less than perfectly semi-spherical. For example, cap 20 may be distorted away from true semi-spherical or have irregularities thereon such that its overall shape would be regarded as partially or substantially semi-spherical. A boot formed of a cap which is partially or substantially semi-spherical can also be rolled-up as above described, provided that it has a height less than or equal to the radius of the largest sphere which can be inscribed therein.

Figure 2:
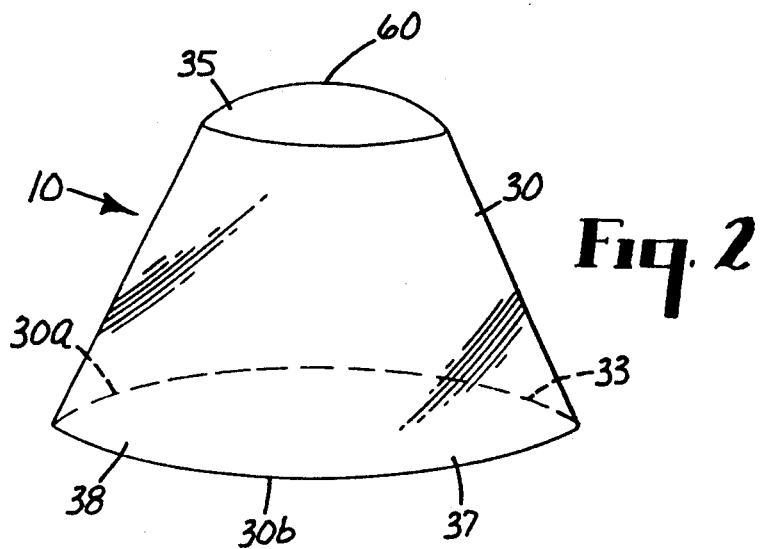
FIG. 2 is a perspective view of a cone-like embodiment of the flexible boot.

The rolled packaging method of the present invention is thus also applicable to rolling-up elastomeric radome boots, preferably of polyurethane, which may not have a semi-spherical or partially semi-spherical surface. Boot 10 as illustrated best in FIG. 2 represents such a boot which has a cone-like major surface 30 which forms a cap as it tapers towards a closed curved end 35.

Figure 2A:
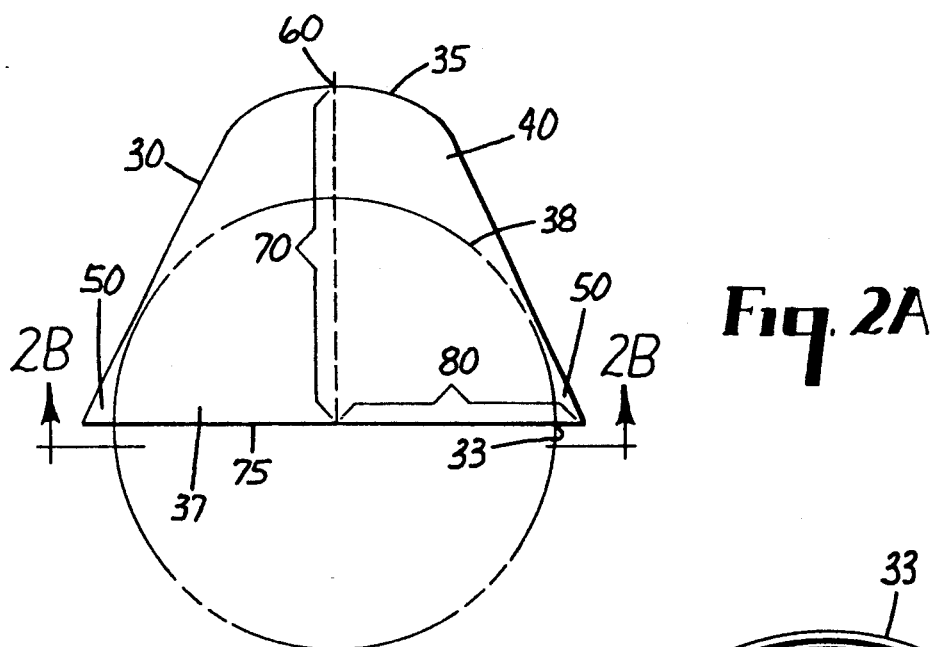
FIG. 2A is an elevational view of the cone-like flexible boot shown in FIG. 2 and also shows an inscribed sphere therein.
Figure 2B:
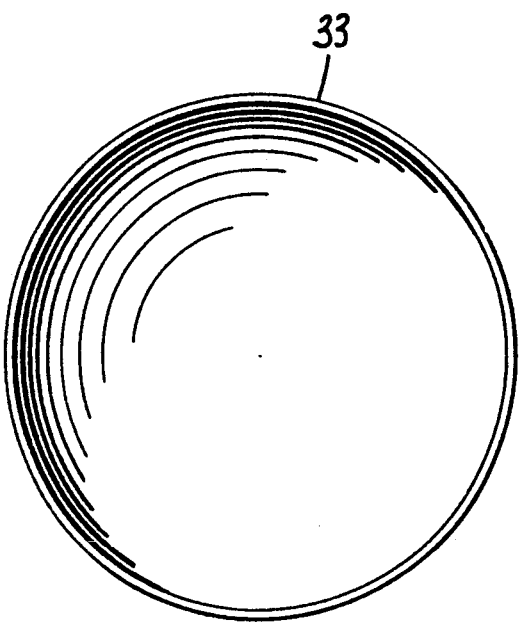
FIG. 2B is an end view of the boot of FIG. 2A taken along sight lines 2B—2B.

Boot 10, has an open end 38 opposite closed end 35, so that the boot has the appearance of a cap which can fit over an aircraft nose cone of like shape. An elevational view of boot 10 is illustrated in FIG. 2A and a cross sectional view along lines 2B—2B appears in FIG. 2B. Cap 30 is continuous and has a high point or apex 60 at its closed end 35. Cap 30 terminates at its open end 37 to form peripheral edge 33 (the trim line) as shown for example in FIG. 2B. Boot 10 has a height 70 which is the perpendicular distance from apex 60 to the base of cap 30 that is, the perpendicular distance from apex 60 to the plane defined by peripheral edge 33. If the largest sphere 38 is drawn within cap 30 there will be a volume portion 40, herein designated as the apex volume, which is adjacent closed end 35 and within the interior of boot 10, but outside of inscribed sphere 38. There can also be other volumes, such as volume 50 herein designated in total as the minor volumes which are contained within boot 10 but lie outside of sphere 38. Boot 10 can be rolled-up into a tight fitting package provided that height 70 is less than or equal to 1.2 times the radius of inscribed sphere 38 and the peripheral edge 33 (also referred to as the trim line) is at or above the equator of inscribed sphere 38 in the direction of closed end 35. If there is any minor volume 50 the totality of such minor volume should preferably be less than about 10% of the total interior volume of boot 10 to assure convenient rollability of the boot.

Boot 10 can be rolled-up into a tight package in the same manner described with respect to boot 5. This can be accomplished by simply folding a portion of cap 30, for example 30a, inwardly onto itself to form a roll. The remaining portion of cap 30, for example 30b, then conveniently overlaps portion 30a whereupon boot 10 takes the form of a tightly rolled-up package having the appearance as in FIG. 5. The rolled-up boot may simply then be inserted into a narrow carton or cylindrical shipping container. There are no creases or wrinkles that develop as boot 10 is rolled-up in the above described manner.

Heavy tissue paper, polymeric film or other cushioning material such as polystyrene packaging nuggets or beads or soft cellular polyethylene or polyurethane foam may be optionally inserted within the interior space of boot 10 before cap 30 is rolled-up. Such cushioning material, as aforementioned, helps to safeguard against wrinkling or creasing during storage or transit.

In use, the flexible boot, for example boot 5 or boot 10, may simply be removed from its shipping container, and unrolled whereupon it is ready for application onto a protruding structure such as the nose cone of an aircraft. The boot of course has been pre-molded to the shape of the structure it is intended to cover. The flexible boot as above described typically has a layer of pressure sensitive adhesive coated onto its inside surface. The adhesive can be acrylic pressure sensitive adhesive, for example as described in Ulrich U.S. Pat. R.E. 24,906. The adhesive may also be a rubber/resin pressure sensitive adhesive, for example as described in Michael and Irene Ash, "A Formulary of Adhesives and other Sealants,"*Chemical Publishing Co.*, New York, NY, 1987, pp. 209-235. The adhesive may be covered with a release liner such as low density polyethylene film having a specific gravity of about 0.92 Sp. gr. The polyethylene film does not have to be precoated. A starter tab may be attached to the polyethylene release liner. Such a tab may be selected from a wide variety of materials. A preferred tab may be selected from No. 355 box sealing tape (Minnesota Mining and Manufacturing Company) which is a synthetic rubber based pressure sensitive adhesive coated onto polyester film. The tab preferably protrudes from the release liner to provide an easily accessible pull area. The tab may also provide a convenient space onto which a product label or insignia may be applied. Thus, in use, once the boot is unfolded and the release liner removed, the boot may be immediately and directly applied over an aircraft nose cone.

Figure 3:
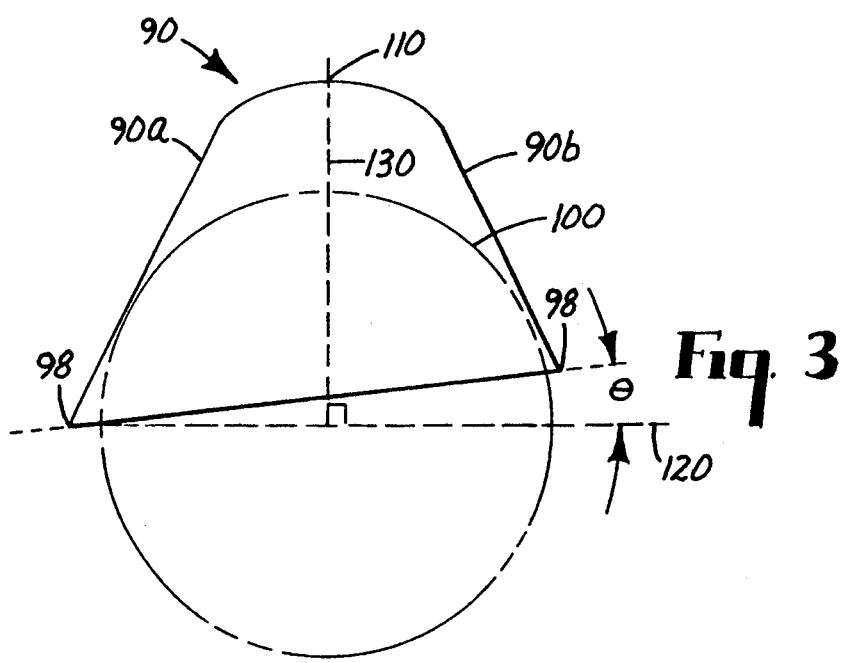
FIG. 3 is an elevational view of an embodiment of the boot with inscribed sphere therein but with one side of the boot surface longer than the other.

Normally the trim line, e.g. peripheral edge 33 of boot 10 lies in a plane which is perpendicular to a line drawn from apex 60 to the center of inscribed sphere 38. In FIG. 3 is illustrated an embodiment of the invention showing a boot 90 wherein one side of the boot 90a is longer than the other side 90b. In this case the trim line, i.e. peripherical edge 98, lies in a plane which will not be perpendicular to a line drawn from apex 110 to the center of inscribed sphere 100. If a hypothetical plane 120 is drawn perpendicular to a line 130 which passes from apex 110 to the center of inscribed sphere 100, then the trim line i.e. peripheral edge 98, may lie in a plane which forms an angle between 0° and about 20° with plane 120. Boot 90 is also preferably formed of a polyurethane elastomer. Boot 90 will be readily rollable into a package form (FIGS. 4 and 5) in the manner described in the foregoing with respect to boot 10, provided the general criteria described with respect to boot 10 are also satisfied.

The flexible boot embodiments, above described eliminate the need for placing the boot onto rigid shipping forms, which can be as costly to manufacture as the boot itself. The flexible boots can be rolled-up and safely stored in rolled condition up to the time of use.

The following example illustrates that the flexible boots of the type above described will not develop discernible creasing or wrinkling if stored in rolled-up condition even at elevated temperature.

EXAMPLE 1

Figure 4:
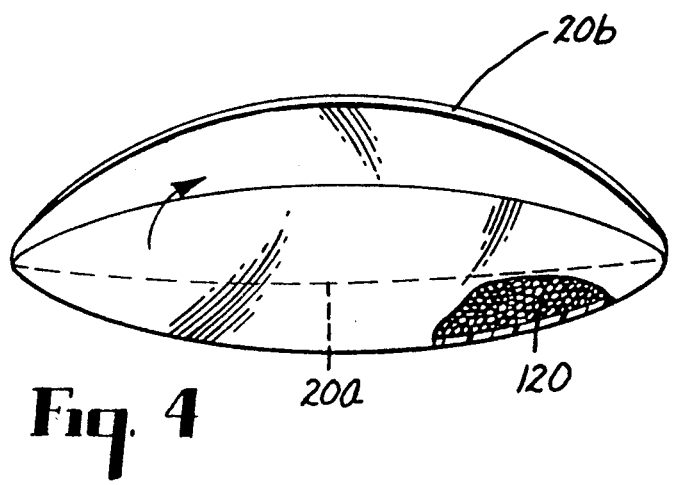
FIG. 4 illustrates the process of rolling up the boot of the invention.
Figure 5:
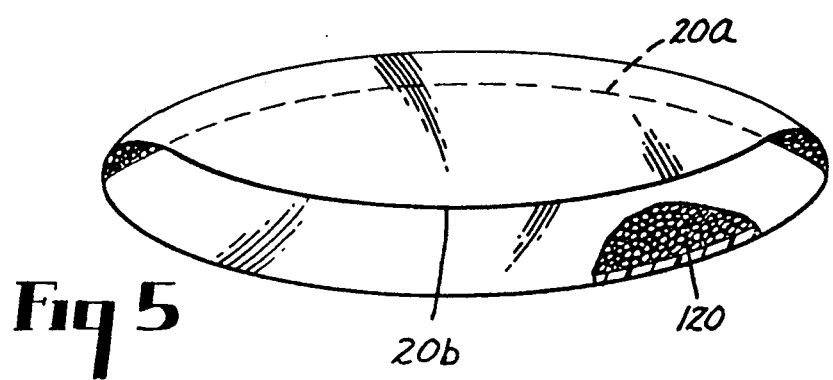
FIG. 5 illustrates the boot in folded (rolled-up) state.

A polyurethane radome boot was molded to a semispherical configuration as in FIG. 1 having a thickness of about 22 mils (0.55 mm) including adhesive liner, a height of 10 inches (25.4 cm) and a diameter of 24 inches (61 cm). The boot was then filled with polystyrene beads and rolled-up in the manner above described and as shown in FIGS. 4 and 5. The boot in its rolled-up state had a width of less than 4 inches (10.2 cm). The edge of the boot was then sealed in one place with a tab made of No. 355 box sealing tape from the 3M Company. This prevented the boot from unravelling. The rolled-up boot was then inserted into a 4 inch diameter (10.2 cm) shipping tube. The shipping tube was then placed in a 158° F. (70°C.) oven for 10 days. Thereupon the boot was removed from the tube. It was unrolled and inspected for damage, creasing or any other distortion.

Upon unrolling the boot, it immediately regained its original semi-spherical shape. There was no wrinkling, creasing or surface distortion which could be visually discerned with the naked eye.

Although the present invention has been described with respect to specific embodiments, the invention is not intended to be so limited. It is possible to deviate from the specific description herein and still be within the scope of the present invention. Hence, the present invention is not intended to be limited to the specific embodiments, but rather is defined by the claims and equivalents thereof.

We claim:

1. A rolled-up flexible boot useful as a protective cover for protruding aircraft structures when unrolled, which boot comprises a cap which has (a) a closed end, (b) an open end surrounded by a peripheral edge, the peripheral edge being essentially free from a flange protruding therefrom, and (c) a body section that tapers toward the closed end from the open end; wherein
   the cap has an inner surface and outer surface; and
   the inner surface defines a cavity therein; and
   the perpendicular distance from the closed end to the plane circumscribed by the peripheral edge is less than or equal to 1.2 times the radius of the largest sphere that can be inscribed within the cap; and
   the peripheral edge is rolled into the cavity to define a hollow volume surrounded by the inner surface of the cap; and
   the cap overlaps itself so that at least a portion of the outer surface of the cap is in contact with the inner surface of the cap to form a rolled-up boot.

2. The rolled-up boot of claim 1 wherein the cap is free from creases and wrinkles while rolled-up.

3. The rolled-up boot of claim 1 wherein said cap comprises polyurethane elastomer.

4. The rolled-up boot of claim 1 wherein said peripheral edge lies at or above the equator (in the direction of said closed end) of the largest sphere which can be inscribed within said cap.

5. The rolled-up boot of claim 1 wherein said cap has a thickness of between about 5 mil (0.13 mm) and 28 mil (0.70 mm).

6. The rolled-up boot of claim 1 further comprising a coating of pressure sensitive adhesive on the inner side of said cap.

7. The rolled-up boot of claim 1 further comprising a cushioning material located within said hollow volume.

8. The rolled-up boot of claim 7 wherein the cushioning material is selected from the group consisting of tissue paper, polymeric film, soft particulate matter and cellular foam.

9. The rolled-up boot of claim 6 further comprising a release liner covering said adhesive.

10. A method for packaging a flexible boot useful as a protective cover for protruding aircraft structures comprising the steps of:
   providing a flexible boot which comprises (a) a closed end, (b) an open end surrounded by a peripheral edge, the peripheral edge being essentially free from a flange protruding therefrom, and (c) a body section that tapers toward the closed end from the open end; wherein the cap has an outer surface and an inner surface that defines a cavity therein, and the perpendicular distance from the closed end to the plane circumscribed by the peripheral edge is less than or equal to 1.2 times the radius of the largest sphere that can be inscribed within the cap; and
   rolling the peripheral edge into the cavity to form a hollow volume which is surrounded by the inner surface of the cap; and
   continuing to roll the edge into the cavity so that at least a portion of the outer surface of the cap is in contact with the inner surface of the cap to form a rolled-up boot.

* * * * *

UNITED STATES PATENT AND TRADEMARK OFFICE
CERTIFICATE OF CORRECTION

PATENT NO. : 5,318,251
DATED : June 7, 1994
INVENTOR(S) : Eugene H. Bergh

It is certified that error appears in the above-identified patent and that said Letters Patent is hereby corrected as shown below:

Col. 2, line 68, "axisof" should read -- axis of--.

Col. 5, line 49, after "adhesive" insert --and--.

Signed and Sealed this

Fourteenth Day of March, 1995

Attest:

Attesting Officer

BRUCE LEHMAN

Commissioner of Patents and Trademarks